(12) United States Patent
Pelkmans et al.

(10) Patent No.: US 11,989,959 B2
(45) Date of Patent: May 21, 2024

(54) METHOD AND COMPUTER PROGRAM FOR CLUSTERING LARGE MULTIPLEXED SPATIALLY RESOLVED DATA OF A BIOLOGICAL SAMPLE

(71) Applicant: UNIVERSITÄT ZÜRICH, Zürich (CH)

(72) Inventors: Lucas Pelkmans, Zürich (CH); Gabriele Gut, Münchenstein (CH)

(*) Notice: Subject to any disclaimer, the term of this patent is extended or adjusted under 35 U.S.C. 154(b) by 695 days.

(21) Appl. No.: 17/257,959

(22) PCT Filed: Jul. 5, 2019

(86) PCT No.: PCT/EP2019/068181
§ 371 (c)(1),
(2) Date: Jan. 5, 2021

(87) PCT Pub. No.: WO2020/008071
PCT Pub. Date: Jan. 9, 2020

(65) Prior Publication Data
US 2021/0224510 A1    Jul. 22, 2021

(30) Foreign Application Priority Data

Jul. 6, 2018 (EP) .................................... 18182243
Jan. 29, 2019 (EP) .................................... 19154219

(51) Int. Cl.
*G06V 20/69* (2022.01)
*G01N 1/30* (2006.01)
(Continued)

(52) U.S. Cl.
CPC ............. *G06V 20/695* (2022.01); *G01N 1/30* (2013.01); *G06F 18/2137* (2023.01); *G06F 18/2323* (2023.01); *G06V 10/7635* (2022.01)

(58) Field of Classification Search
CPC ..... G01N 1/30; G06F 18/2137; G06F 18/2323; G06V 10/7635; G06V 20/695
See application file for complete search history.

(56) References Cited

U.S. PATENT DOCUMENTS

| | | | | |
|---|---|---|---|---|
| 2005/0216207 A1* | 9/2005 | Kermani | ................ | G16B 40/00 702/20 |
| 2009/0034823 A1* | 2/2009 | Christiansen | .......... | G06V 20/69 382/133 |

(Continued)

FOREIGN PATENT DOCUMENTS

WO    2016201186    12/2016

OTHER PUBLICATIONS

Ruan, Da, Alastair Young, and Giovanni Montana. "Differential analysis of biological networks." BMC bioinformatics 16.1 (2015): 1-13. (Year: 2015).*

(Continued)

*Primary Examiner* — Michelle M Entezari Hausmann
(74) *Attorney, Agent, or Firm* — JMB DAVIS BEN-DAVID

(57) ABSTRACT

The invention relates to a method for processing large multiplexed image data of a biological sample, the method comprising the steps of, recording a plurality of images of a biological sample, wherein the plurality of images comprises images having a different entity of the biological sample targeted with a predefined stain, determining spatially corresponding image pixels in the plurality of registered images, associating the spatially corresponding image pixels to a pixel profile, wherein each pixel profile comprises the pixel values of the spatially corresponding pixels and wherein the pixel profile is associated with the respective image coordinate of the spatially corresponding pixels, pooling the pixel profiles by means of a clustering method configured to determine pixel profiles with similar values, (Continued)

Figure 1:
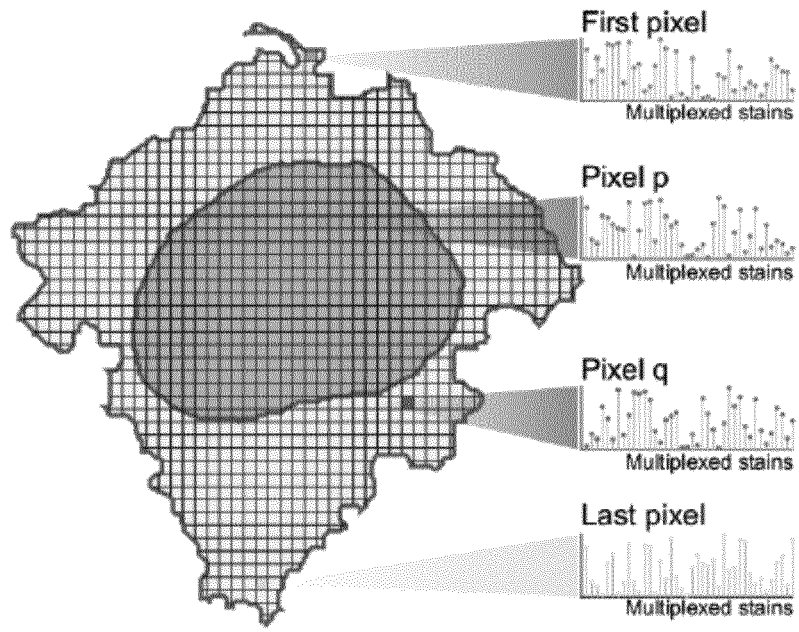
Figure 1:
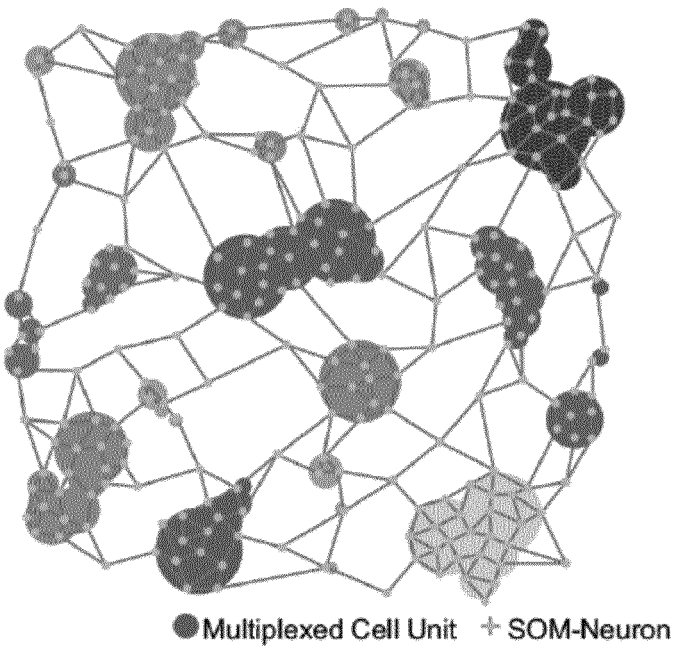
Figure 1:
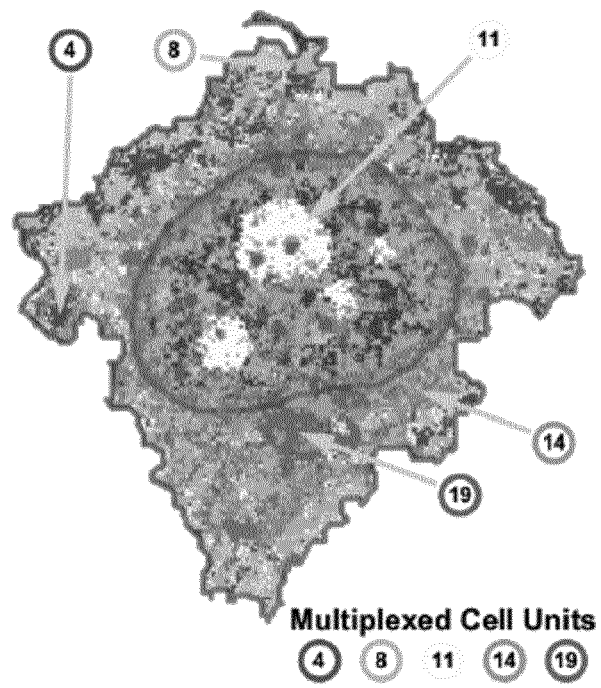
Figure 1:
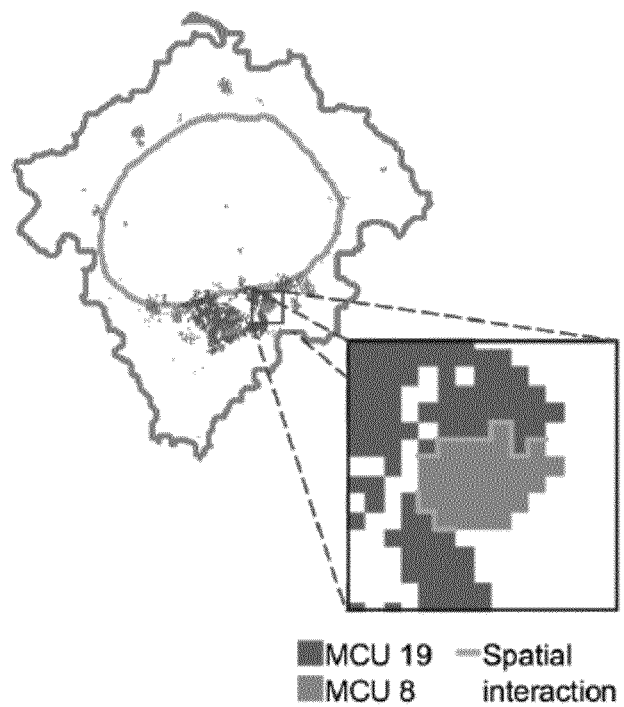

and thereby generating a plurality of clusters, each comprising pixel profiles with similar pixel values, for each cluster assigning a cluster value to the image coordinate of the pixel profiles comprised by said cluster and thereby generating a cluster image with cluster pixels.

16 Claims, 12 Drawing Sheets

(51) Int. Cl.
*G06F 18/2137* (2023.01)
*G06F 18/2323* (2023.01)
*G06V 10/762* (2022.01)

(56) References Cited

U.S. PATENT DOCUMENTS

| | | | |
|---|---|---|---|
| 2013/0053551 A1* | 2/2013 | Falkenstein | C07K 14/775 530/416 |
| 2013/0090254 A1* | 4/2013 | Lamb | G16B 25/10 702/20 |
| 2014/0134623 A1* | 5/2014 | Hiddessen | G01N 21/645 366/108 |
| 2017/0262984 A1 | 9/2017 | Barnes et al. | |
| 2018/0280972 A1* | 10/2018 | Guzman | G01N 33/54326 |
| 2018/0292394 A1* | 10/2018 | Soldo | B01D 15/3809 |
| 2019/0032105 A1* | 1/2019 | Quiring | C12N 9/2474 |
| 2019/0080146 A1* | 3/2019 | Santamaria-Pang | G06V 10/774 |
| 2021/0097684 A1* | 4/2021 | Mellen | G16B 15/00 |
| 2022/0245802 A1* | 8/2022 | Wang | G16H 50/30 |

OTHER PUBLICATIONS

Fattah, Shaikh Anowarul, Chia-Chun Lin, and Sun-Yuan Kung. "A mutual information based approach for evaluating the quality of clustering." 2011 IEEE International Conference on Acoustics, Speech and Signal Processing (ICASSP). IEEE, 2011. (Year: 2011).*

Cilibrasi, Rudi, and Paul MB Vitányi. "Clustering by compression." IEEE Transactions on Information theory 51.4 (2005): 1523-1545. (Year: 2005).*

Ben-Dor, Amir, and Zohar Yakhini. "Clustering gene expression patterns." Proceedings of the third annual international conference on Computational molecular biology. 1999. (Year: 1999).*

Gerdes et al "Highly multiplexed single-cell analysis of formalin-fixed, paraffin-embedded cancer tissue", Proc Natl Acad Sci U S A Jul. 16, 2013;110(29):11982-7. seen online at doi: 10.1073/pnas.1300136110.

Gerdes et al "supporting information for Highly multiplexed single-cell analysis of formalin-fixed, paraffin-embedded cancer tissue" pp. 1-15, seen online at: https://www.pnas.org/content/pnas/suppl/2013/06/28/1300136110.DCSupplemental/pnas.201300136SI.pdf.

Gut et al "Multiplexed protein maps link subcellular organization to ccellular states", Science Aug. 3, 2018: vol. 361, Issue 6401, eaar7042 seen online at DOI: 10.1126/science.aar7042.

Gut et al"Supplementary Materials: Multiplexed protein maps link subcellular organization to cellular states" pp. 1-18, including supplementary table. seen online at https://science.sciencemag.org/content/suppl/2018/08/01/361.6401.eaar7042.DC1 Science Aug. 3, 2018: vol. 361, Issue 6401.

* cited by examiner

① Extraction of multiplexed pixel intensities
~20000 pixels for ~2000 cells

② Highly-plexed pixel clustering
by Self-Organizing Maps and Phenograph

③ Identification of MCUs
Unsupervised subdivision of cells

Multiplexed Cell Units
④ ⑧ ⑪ ⑭ ⑲

④ Spatial interaction analysis
quantifying cellular organization

■ MCU 19  — Spatial
■ MCU 8      interaction

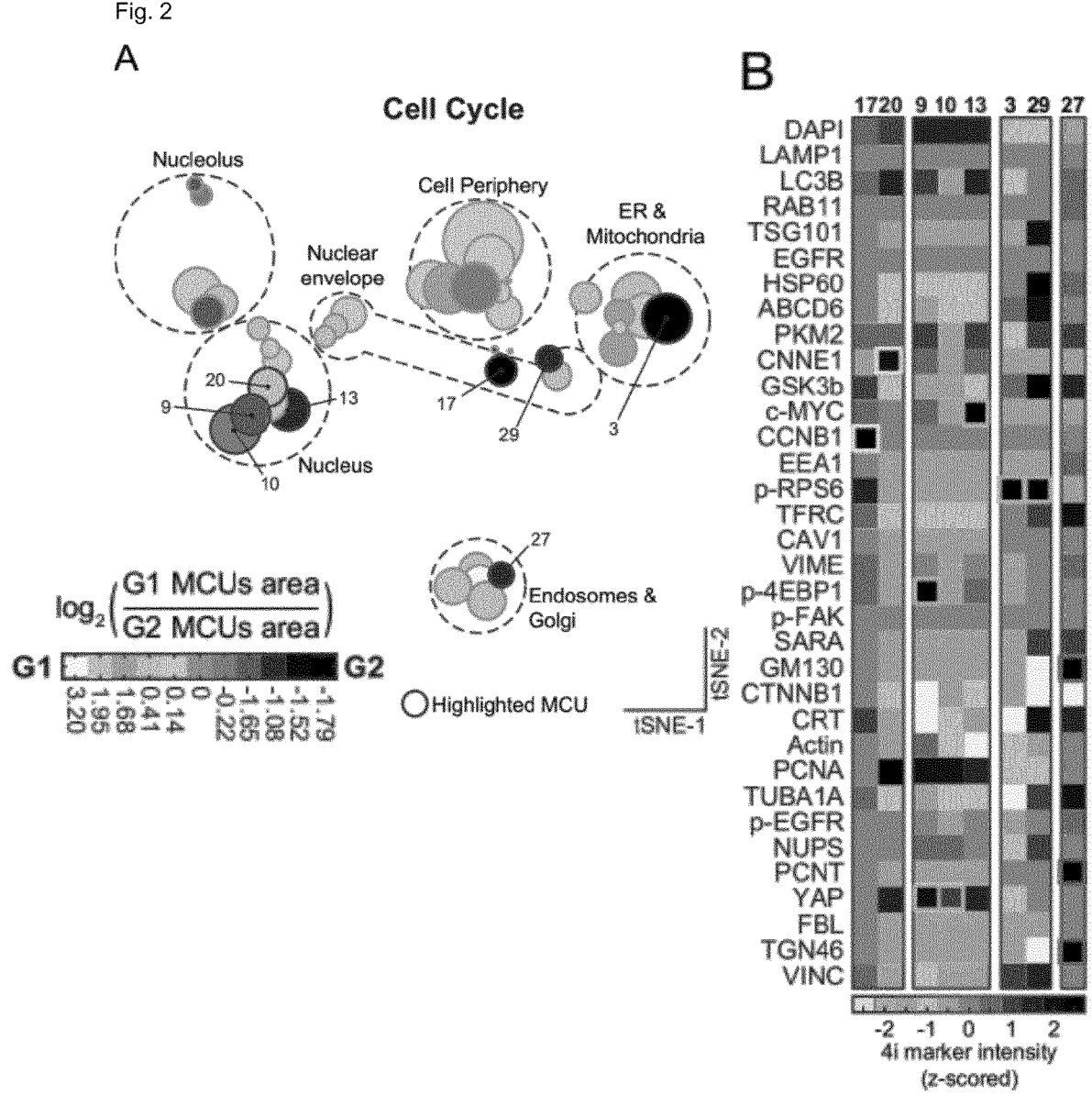

D

E

F

A

B

C

METHOD AND COMPUTER PROGRAM FOR CLUSTERING LARGE MULTIPLEXED SPATIALLY RESOLVED DATA OF A BIOLOGICAL SAMPLE

CROSS-REFERENCE TO RELATED APPLICATIONS

This is the U.S. National Stage of International Patent Application No. PCT/EP2019/068181 filed on Jul. 5, 2019, which in turn claims the benefit of European Patent Application No. 18182243.8 filed on Jul. 6, 2018 and European Patent Application No. 19154219.0 filed on Jan. 29, 2019.

The invention relates to a method and a computer program for clustering large multiplexed data of a biological sample.

Obtaining highly multiplexed protein measurements across multiple length scales plays an important role in biomedicine. However, datasets of such measurements are comparably large and a comprehensive analysis is elaborate.

For example, labeling 40 different cellular structures, such as proteins in a tissue sample result in 40-plex protein readout that ideally covers the millimeter down to the nanometer scale. With such data properties apparent at the population level, such as cellular microenvironment, at the cellular level, such as cell morphology and cell cycle state, and at the subcellular level, such as the detailed morphology of organelles, cytoskeletal structures, nuclear sub-compartments, and the fate of signaling receptors in thousands of single cells in situ can be captured simultaneously.

To obtain functionally relevant information, known unbiased large-scale methods need to extend the length scale of molecular multiplexing into the intracellular domain, and ultimately acquire temporal information.

It is for example known that high-resolution intracellular immunofluorescence imaging of 12,000 proteins, from which an average subcellular map of the human proteome can be created [1]. However, to understand how the subcellular distribution of the proteome is functionally linked to the phenotypic state of a cell and its microenvironment and how it responds to varying conditions, such maps must be directly measured in the same single cell and across many cells in situ. While various powerful methods exist that can achieve spatially resolved antibody multiplexing on tissues or single cells (4, 5, 13-21), none meet all requirements to simultaneously cover the tissue, single cell, and highly resolved intracellular length scale whilst preserving sample quality in a high-throughput manner for multiple conditions, and be combined with large-scale image processing and multivariate statistical approaches to extract the rich amount of biological information present in such data.

An object of the present invention is to provide a method and a computer program that solves these problems. The object is achieved by the method having the features of claim 1 and the compute program having the features of claim 15.

Advantageous embodiments are described in the subclaims.

According to claim 1, a method for processing, particularly clustering, large, e.g. several dozens of Megabytes, Gigabytes or Terabytes, multiplexed image data of a biological sample particularly obtained from a subject, comprises at least the steps of:

a) Recording a plurality of images, the images each comprising image pixels or voxels of a biological sample, wherein the plurality of images comprises images having a different entity of the biological sample targeted, e.g. labeled with a predefined stain;

b) Determining spatially corresponding image pixels in the plurality of particularly registered images and particularly assigning an image coordinate to the spatially corresponding image pixels;

c) Associating, e.g. by concatenating the spatially corresponding image pixels to a pixel profile, wherein each pixel profile comprises the pixel values of the spatially corresponding pixels and wherein the pixel profile is associated with the respective image coordinate of the spatially corresponding pixels;

d) Pooling, particularly grouping together the pixel profiles by means of a clustering method configured to determine particularly similar pixel profiles with similar values, and thereby generating a plurality of clusters, each comprising pixel profiles with similar pixel values;

e) For each cluster assigning particularly a single cluster value to the image coordinate of the pixel profiles comprised by said cluster and thereby generating a cluster image with cluster pixels having the image coordinates of the spatially corresponding image pixels;

f) Particularly displaying the cluster image on or with a display device.

The method according to the invention solves the problem of the large datasets and the processing of such datasets, by applying a clustering method that determines similar pixel profiles and thus similar structures in the biological sample.

The term 'multiplexed image data' particularly refers to image data acquired for the same biological sample, particularly from the same portion of the biological sample.

For this purpose the biological sample can be labeled and imaged with a plurality of different stains either simultaneously or sequentially. The stains are particularly configured to target a specific structure, such as a specific protein, in the biological sample. The stains are particularly fluorescent dyes that emit within a predefined wavelength band when excited with light. It is possible to image a plurality of different stains simultaneously that for example emit at different wavelength or that exhibit other distinguishable spectral properties such as the decay time.

Alternatively or additionally the imaging and labeling process can be performed sequentially. This allows for using dyes with identical or nearly identical spectral properties.

The multiplexed image data set particularly comprises more than 5, more particularly more than 30, and even more particularly more than 40 different images recorded from different stains that are particularly targeted to different structures in the biological sample.

The imaging can be performed on a microscope. The microscope can be a confocal microscope, a spinning disk, or a wide field microscope. The images date can be acquired by a camera or by scanning with point detectors or array detectors.

The biological sample is particularly a tissue sample obtained from a subject, such as a person or an animal. The biological sample can also be a cell culture sample, such as 3D-culture sample or a 2D cell culture.

The sample can also be a tissue section suitable for optical imaging.

In order to target the stains, particularly the fluorescent dyes to the structure, it is possible to use antibodies labeled with the respective stain such that a well-established antibody staining can be performed.

After each imaging step the antibodies can be washed off the sample and new antibodies targeting a different structure can be used.

Due to thermal drift of the imaging system and other particularly external influences, it might be necessary to pre-process the acquired images such that each portion in the object space of the imaging system is comprised by the same image pixel.

For this reason, according to an embodiment of the invention, the plurality of images is particularly spatially registered for example by registering the images with a Fourier-Transform registering method.

The registering is particularly performed such that fractions of pixel shifts are possible.

The registration step is particularly carried out before step b) of the method according to the invention.

The term "spatially corresponding image pixels" particularly relates to pixels of different images, wherein the spatially corresponding image pixels comprise an image portion that corresponds to the same location in the sample.

The spatially corresponding pixels particularly have the same image coordinate.

According to another embodiment of the invention, a background signal in each image is adjusted, and/or wherein each image is rescaled to a value between 0 and 1 and/or z-normalized.

The pixel value of each pixel of an image can be an 8 bit, a 12 bit, a 16 bit or a 24 bit pixel value, i.e. each image pixel can assume 256, 4096, 65536, or 16777215 pixel values respectively.

Each image in turn can comprise 512 pixels times 512 pixels, or more.

The pixel profile associated to the spatially corresponding image pixels particularly comprises the pixel values of the spatially corresponding image pixels such that each pixel profile can be expressed as a vector with entries corresponding to the pixel values of the associated pixels.

The number of entries of the vector depends on the number of multiplexed images, i.e. on the number of images from the plurality of images.

Each pixel profile has an associated image coordinate.

The image coordinate of a pixel is a position of the pixel in the image. The pixel profile therefore can be assigned to a specific location in an image of the plurality of images.

In step e) of the method according to the invention, the pixel profiles are analysed such that similar pixel profiles are grouped together by means of a clustering method.

Thus, similar pixel values can be also identified by a specific pattern or sequence of pixel values in the pixel profiles.

The goal of the clustering method is to identify pixel profiles that comprise similar pixel values.

The term 'similar" refers to a similarity metric that is for example based on the Euclidean distance of one pixel profile to another. However, other similarity metrics are possible and conceivable.

For example, a similarity metric or similarity between pixel profiles, can be a correlation coefficient, or arise from the specific nature of a clustering method, such as a neuronal network, a trained classifier, a machine learning method, or even an untrained cluster method.

The similar pixel profiles are identified and grouped together to clusters. Thus, each cluster comprises a plurality of pixel profiles that are similar to each other.

Each cluster therefore has a plurality of image coordinates associated to it that are particularly inherited by the pixel profiles comprised by the respective cluster.

Each pixel profile is particularly assigned to one cluster only. A cluster value is assigned to each cluster.

As particularly each pixel profile is grouped to a cluster, a cluster image that has particularly the same pixel dimensions as the plurality of images can be generated.

The pixels of the cluster image are referred to as cluster pixels. Cluster pixels from the same cluster have the same cluster value associated to it.

The cluster pixels with the associated cluster values can be displayed as an image. The cluster image particularly represents an image of the biological sample with a reduced number of gray or color values and/or unified portions that are considered similar with respect to the multiplexed data acquired in the plurality of images.

The cluster image can be represented by a matrix having the same number of rows and columns as the images from the plurality of images.

The method according to the invention therefore allows reducing the number of dimensions provided by the plurality of images and to display a comprehensive cluster image of the multiplexed image data that particularly allows identifying portions of the biological sample that exhibit similar characteristics.

According to another embodiment of the invention, the additional steps are performed, namely:

i) For each cluster pixel in the cluster image, the cluster values of particularly directly adjacent cluster pixels in the cluster image are determined so as to provide a plurality of cluster value pairs and thereby for each cluster value pair a probability of adjacency is determined;

ii) Generating at least one randomized cluster image, wherein the image coordinates of the cluster pixels in the at least one randomized cluster image are randomly inter-changed;

iii) For each cluster pixel in the at least one randomized cluster image the cluster values of the particularly directly adjacent cluster pixels in the randomized cluster image are determined and thereby for each cluster value pair a probability of random adjacency is determined and wherein the probability of random adjacency is determined for all of the randomized cluster images;

iv) Determining an adjusted probability of adjacency by calculating a deviation such as a difference between the probability of adjacency and the probability of random adjacency;

v) Generating and particularly displaying an interaction map, wherein the clusters are arranged at a distance to each other, wherein the distance is indicative to the absolute value of the adjusted probability of adjacency.

This embodiment allows for determining clusters that tend to be in proximity of each other and also for mutually exclusive clusters, i.e. clusters that have a comparably low probability of being located next to each other.

The probability of adjacency for each cluster value pair is determined by calculating the frequency of occurrence of said cluster value pair with respect to other cluster value pairs.

The frequency of occurrence is a measure for the probability of adjacency, i.e. the probability of adjacency can be expressed as a normalized frequency of occurrence with respect to other cluster value pairs.

In order to remove random correlations of cluster value pairs and misinterpretation of the cluster image data, the determined probabilities of adjacency are corrected for random adjacency that occurs due to statistical coincidence.

For this purpose the clusters are randomly reassigned particularly to different image coordinates. Thus the randomized cluster images have the same number of columns and rows as the cluster image.

It is not necessary to display the randomized cluster images.

The probability of random adjacency for the randomized cluster image is calculated in the same way as the probability of adjacency for the cluster image. The probability of random adjacency is particularly determined for a plurality of randomized cluster images. From the resulting random adjacency probabilities an average value can be calculated for each cluster value pair that is used for adjusting the determined probability of adjacency.

The adjusted probability of adjacency can be also negative. A negative adjusted probability is indicative to cluster value pairs that tend not to be adjacent to each other, i.e. these cluster value pairs repel each other. A positive adjusted probability of adjacency is indicative to cluster value pairs that tend to be in particularly direct adjacency, i.e. these cluster value pairs attract each other. The larger the absolute value of the adjusted probability the stronger the attraction or repulsion respectively.

Depending on the kind of deviation that is estimated between the random probability of adjacency and the determined probability of adjacency it is also possible to define a different metric for attracting and repelling clusters, that does not necessary involve negative adjusted probabilities.

For a 2D-cluster image with regularly spaced pixels, for each cluster pixel there are particularly eight surrounding directly adjacent cluster pixels. Thus, for each cluster pixel particularly eight cluster value pairs can be determined. If also neighbouring cluster pixels are considered that are further away, e.g. in a two-pixel distance, additionally 16 cluster value pairs can be estimated for each cluster pixel such that in total 24 cluster value pairs are generated and consequently 24 probabilities of adjacencies for each cluster pixel.

For example the probability of adjacency for a cluster X and a cluster Y, the adjusted probability of adjacency can be expressed and calculated as follows:

$$p1(X, Y) = \frac{n_X(Y)}{N}, \; p2(X, Y) = \frac{n_X^*(Y)}{N}, \; p(X, Y) = p1(X, Y) - p2(X, Y)$$

wherein p1(X,Y) is the probability of adjacency for cluster X and cluster Y, p2(X,Y) is the corresponding probability of random adjacency for cluster X and cluster Y, and p(X, Y) is the adjusted probability of adjacency for cluster X and cluster Y in the cluster image. N is the number of all adjacent cluster pixels of the cluster pixels of cluster X, $n_X(Y)$ is the number of all cluster pixels associated to cluster Y and adjacent to cluster pixels of cluster X, $n_X^*(Y)$ is the number of all cluster pixels associated to cluster Y and adjacent to cluster pixels of cluster X derived from a randomized cluster image. In order to determine the probability of random adjacency more accurate a plurality of randomized cluster images is generated and the probability of random adjacency is calculated for each of the plurality of the randomized cluster images. A single probability of random adjacency can be derived by means of averaging the probabilities of random adjacency.

To what extend a specific cluster is attracted or repelled by other clusters, can be displayed by assigning a distance indicative to the particularly absolute value of the adjusted probability of adjacency.

The attraction and repulsion of a cluster value pair can be graphically illustrated by assigning a distance to the adjusted probability of adjacency, wherein the distance is related to the absolute value of the adjusted probability of adjacency. This illustration is termed an interaction map.

In case the absolute values of the adjusted probabilities are used for illustrating the attraction or repulsion, an additional graphical element can be used to indicate, whether two cluster pairs are attracted to each other or repelled.

The distance between two cluster value pairs is particularly correlated, more particularly proportional to the adjusted probability of adjacency.

This adjusted probability of adjacency and the display thereof allows for a convenient visualization of inter-actions between similar clusters.

According to another embodiment of the invention, each cluster in the interaction map is displayed as a geometric shape, wherein a size particularly the diameter of the geometric shape is indicative, and particularly corresponds to a relative occurrence of the cluster with respect to the occurrence of the other clusters, and/or wherein the geometric shapes are connected by particularly straight lines, wherein a negative adjusted probability is reflected in a first line color and a positive adjusted probability is reflected in a second line colour, particularly wherein the length of the line or the distance between the clusters is indicative for the adjusted probability of adjacency as detailed above.

An interaction map according to this embodiment allows for displaying complex interaction data of structures in the sample in an easy-to-perceive and easy-to-comprehend manner.

According to another embodiment of the invention, the clusters are arranged in the interaction map by a dimensionality reduction method, such as a distributed stochastic neighbor embedding (tSNE) method.

tSNE is a nonlinear dimensionality reduction machine learning method for embedding high-dimensional data for visualization in a low-dimensional space of two or three dimensions.

tSNE particularly models each cluster or pixel profile by a two- or three-dimensional point in such a way that similar cluster or pixel profiles are modelled by nearby points and dissimilar clusters or pixel profiles are modelled by distant points with high probability.

According to another embodiment of the invention, the plurality of images comprises a first set of images and a second set of images, wherein the first set of images comprises or consists of images of the biological sample under a first experimental condition, such as a control condition, and the second set of images comprises or consists of images of the biological sample under a second experimental condition, wherein the first and second set comprise corresponding images that are recorded from the biological sample and particularly from the same portion of the biological sample having the same entity, i.e. the same biological structure such as a protein of the biological sample targeted with the same stain, particularly wherein at least the steps b) to e) according to the invention are executed on both sets particularly simultaneously, such that the same clusters are generated for the first and second set of images.

This embodiment allows for comparing a biological sample of interest under two different conditions and generating cluster images with identical clusters, such that the comparison between the two conditions is possible.

It can be advantageous to simultaneously process the image data from the first and the second set of images. The term simultaneously in this context refers to a joint processing of the plurality of images irrespective of whether the images belong to the first or the second set of images.

The term 'experimental condition" refers to parameters under which an experiment has been performed on the biological sample. An experimental condition is for example physical parameter such as a temperature, a pressure, a pH value, an illumination of the sample, and/or a chemical parameter such as a solution, a composition of a culture medium, an exposure to a compound such like a drug.

According to another embodiment of the invention, the relative occurrence of the cluster is determined from the images of the first and second set of images, wherein a color of the geometric shape is indicative of whether the relative occurrence of the cluster has become smaller or larger under the second experimental condition with respect to the first experimental condition, particularly wherein the relative occurrence of the cluster is transformed, particularly normalized, by an inverse hyperbolic sine function and z-scored with an average value such as the mean value, and a standard deviation measured for each relative occurrence in the first set of images.

The color of the geometric shape refers to a display color that is used to display the geometric shape. This can be done continuously, i.e. that a lookup table for the color is used wherein the lookup table correlates with the relative occurrence of the cluster under the first condition compared to the relative occurrence of the cluster the second condition.

Optionally a normalization of the distributions is performed with an inverse hyperbolic sine function. The inverse hyperbolic sine function transforms distributions exhibiting heavy tails to more compact, quasi-normal distributions. Normal distributions are well-suited for input for z-score normalization.

This embodiment allows for an interaction map that displays a variety of information regarding the first and second set of images to a user, such that a difference between the first and the second experimental condition can be perceived comparably easy.

According to a further embodiment of the invention, the clustering method executes
- an ensemble learning method, particularly random forest clustering or k-means clustering, and/or
- an artificial neural network, particularly growing neural gas or a self-organizing map method, and/or
- a graph-based method, such as phenograph, and determines the clusters.

According to a further embodiment of the invention, the clustering method executes in a first step
- an ensemble learning method, particularly random forest clustering or k-means clustering, and/or
- an artificial neural network, particularly growing neural gas or a self-organizing map method, and/or wherein the clustering method executes in second step
- an ensemble learning method, particularly random forest clustering or k-means clustering, and/or
- an artificial neural network, particularly growing neural gas or a self-organizing map method, and/or
- a graph-based method, such as phenograph, wherein the ensemble learning method, the artificial neural network and/or the graph-based method of the second step further processes the results of the ensemble learning method and/or the artificial neural network of the first step, particularly the self-organized map, and determines the clusters.

In certain embodiments, the first step comprises or generates 2 clusters to 2000 clusters, particularly more than 1000 nodes, more particularly more than 2000 nodes, most particularly wherein the self-organizing map method comprises more than 1000 nodes, particularly more than 2000 nodes.

According to another embodiment of the invention, wherein the clustering method executes in a first step a self-organizing map method that provides a self-organized map with nodes and connections between the nodes and/or wherein the clustering method executes in second step a graph-based method, such as phenograph, wherein the graph-based method further processes the self-organized map and determines the clusters, wherein if only the first step of the clustering method is executed the nodes correspond to the clusters.

According to this embodiment it is possible to generate the cluster using either a self-organizing map method alone or in combination with a graph-based method to generate the clusters form the plurality of images.

A self-organizing map (SOM) method is an artificial neural network used in unsupervised learning methods.

In combination with the graph-based method such as phenograph, the method according to the invention allows for a clustering of the pixel profiles such that a reduced number of cluster values is generated and such that distinguishing features of the pixel profiles are sustained. The reduction of information comprised in the pixel profiles by the clustering method is paramount in order to make the amount of information manageable by a person.

Phenograph is a graph-based method as for example described in [2].

According to another embodiment of the invention, the clustering method comprises or consists of the SOM method and/or the graph-based method, wherein the SOM method and/or the graph-based method are particularly by design configured to cluster the pixel profiles according to the similar pixel values.

According to another embodiment of the invention, the self-organizing map method comprises more than 1000 nodes, particularly more than 2000 nodes.

This number of nodes allows for a good trade-off between number of clusters for different features of the biological sample and reduction of information.

According to another embodiment if the invention, the biological sample comprises a plurality of biological cells, particularly more than 100 cells.

The biological cells can be for example animal cells, plant cells or prokaryotes.

According to another embodiment of the invention, the plurality of images comprises the biological sample targeted with at least 5, particularly at least 20 different stains.

The stains can be applied sequentially, with washing steps in between the acquisition of images, or simultaneously, particularly if the stains exhibit different spectral properties as laid out above.

Using at least 5 stains for labelling different structures of the biological sample allows for generating a dataset that is rich of information and that allows to extract and monitor potentially complex interaction behaviour between the labelled structures.

With conventional approaches clustering this amount of data is problematic and a comprehensive visualization as described above and in the examples is not possible.

According to another embodiment of the invention, three-dimensional image data is acquired from the biological sample such that three-dimensional volumetric images are generated from the biological sample, wherein the image pixels are voxels and particularly wherein the images correspond to layers in the three-dimensional image data.

This embodiment allows for a comprehensive data evaluation by the method according to the invention, as not only a particularly thin layer (two-dimensional images) of the biological sample is investigated and processed by the method according to the invention, but a three-dimensional volume of the biological sample.

Particularly if the biological sample is a tissue sample or a 3D-cell culture, it is advantageous to acquire a complete volume portion of the sample and not only a thin, quasi two-dimensional layer.

According to another embodiment of the invention, the biological sample consists of a single cell only or wherein the biological sample is a tissue sample obtained from a subject.

According to another embodiment of the invention, the pixel profiles are pooled, e.g. grouped in at least 20 different clusters.

According to another embodiment of the invention, wherein for each stain at least the following steps are performed such as to generate the plurality of images from the biological sample:

Labeling the biological sample with the stain, wherein the stain is particularly attached to a first antibody, and wherein the stain is particularly a fluorescent dye, Blocking unspecific binding sites of the biological sample using a blocking buffer, wherein unspecific binding sites of the biological sample are covered by a blocking agent comprise din the blocking buffer, Acquiring at least one image of the plurality of images from the sample in an imaging buffer, Eluting the stain from the biological sample with an elution buffer.

According to another embodiment of the invention, a set of buffers is used for blocking, imaging the sample and eluting the stains, particularly stains comprising or being attached to antibodies, between subsequent imaging steps for generating the plurality of images, the set of buffers comprising a blocking buffer comprising a blocking compound that is capable of binding to hydrophobic binding sites non-specifically, a sulfhydryl-reactive compound and a buffering component;

an imaging buffer comprising a thiol-containing compound and a pH between 7.2 and 7.6;

an elution buffer comprising a reducing agent, at least one compound disrupting hydrogen bonds, a buffering component and a pH lower than (<) 4.

In the context of the present specification, the term biological sample prepared for imaging refers to any biological material that is fixed on a device usable for imaging, particularly but not limited to fluorescence microscopy. The biological sample prepared for imaging may be selected from but is not limited to paraformaldehyde-fixed cells or tissue on a glass slide or multiwell plates (glass/plastic) or any other type of specimen holder suitable for microscopy.

In the context of the present specification, the term antibody refers to whole antibodies including but not limited to immunoglobulin type G (IgG), type A (IgA), type D (IgD), type E (IgE) or type M (IgM), any antigen binding fragment or single chains thereof and related or derived constructs. A whole antibody is a glycoprotein comprising at least two heavy (H) chains and two light (L) chains interconnected by disulfide bonds. Each heavy chain is comprised of a heavy chain variable region (VH) and a heavy chain constant region (CH). The heavy chain constant region is comprised of three domains, CH1, CH2 and CH3. Each light chain is comprised of a light chain variable region (abbreviated herein as VL) and a light chain constant region (CL). The light chain constant region is comprised of one domain, CL. The variable regions of the heavy and light chains contain a binding domain that interacts with an antigen. Similarly, the term encompasses a so-called nano-body or single domain antibody, an antibody fragment consisting of a single monomeric variable antibody domain.

In the context of the present specification, the term thiol-containing compound is used for a compound that quickly reacts with and thereby removes free radicals.

The problem is also solved by a computer program, wherein the computer program comprises instructions which, when the computer program is executed by a computer, cause the computer to carry out the method according to the invention, particularly all computer executable steps.

Furthermore, the problem is also solved by a computer program product, wherein the computer program product is stored on a non-transitory medium, wherein the computer program product comprises instructions which, when the instructions are executed by a computer, cause the computer to carry out the method according to the invention, particularly all computer executable steps.

The term 'computer', or a system thereof, is used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The term 'computer' denotes also a plurality of processors or computers connected, and/or linked and/or otherwise communicating, possibly sharing one or more other resources such as a memory.

The term 'computer program" denotes one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor, a computer or other circuitry.

The processor and program may constitute the same apparatus, at least partially, such as an array of electronic gates, such as FPGA or ASIC, designed to perform a programmed sequence of operations, optionally comprising or linked with a processor or other circuitry.

In the following, the invention is explained in detail with reference to exemplary embodiments shown in the figures. It is noted that the drawings are not necessary to scale.

FIGURE DESCRIPTION

FIG. 1 Interaction maps quantify subcellular organization and spatial interactions of pixel profile clusters (herein called multiplexed cell units)

Schematic of the statistical analysis for the generation of interaction maps and identification of pixel profile clusters, herein called multiplexed cell units (MCUs) by 2-step clustering of pixel profiles (see for example FIG. 3A). In FIG. 1A, first (1) all pixel profiles of cells are extracted and (2) clustered using Self-Organizing Map (SOM). The resulting SOM nodes are then further clustered by Phenograph (FIG. 3B). In the context of the current specification the identified clusters are also referred to as multiplexed cell units (MCUs). MCUs represent areas in cells comprising pixels with common profiles of 16-bit 4i multiplexed pixel intensities recorded for each stain (also referred to as marker) (FIG. 3C). Those can be projected back onto the cell's segmentation FIG. 1A (3). Pair-wise spatial interactions between all MCUs are calculated resulting in spatial interaction score profiles, which quantify the extent of spatial proximity of MCUs to each other in cells.

Figure 2:
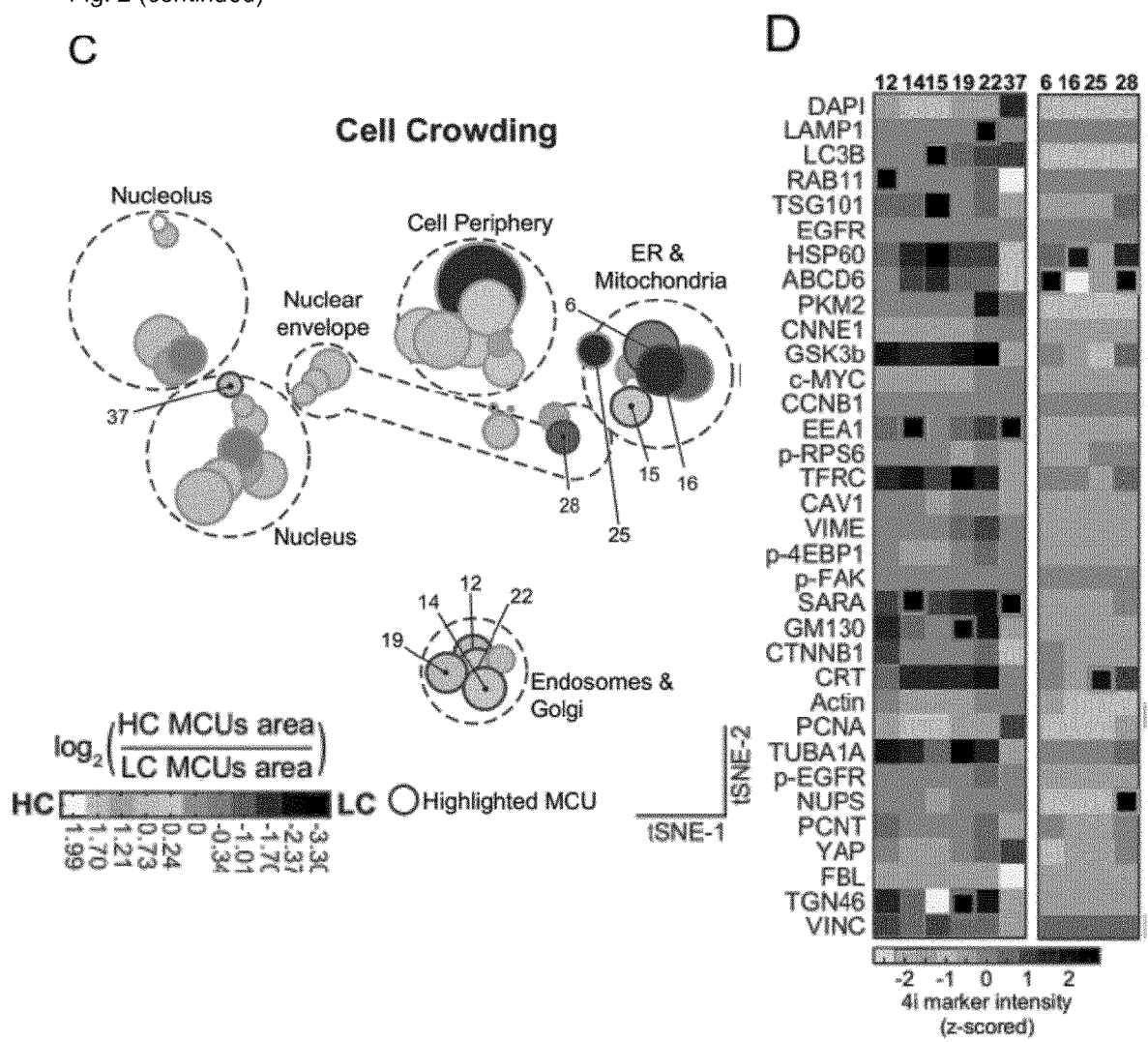

FIG. 2 Comprehensive quantification of subcellular reorganization by cellular state and microenvironment (A) Interaction maps identify differential abundance of MCUs associated with cytoplasmic and nuclear growth signaling between cells in G1 and G2 phase of the cell cycle. Network representing interaction maps generated from a population of 300 unperturbed HeLa cells. Geometrical shape diameters are scaled according to the fraction of pixels in cells assigned to them. Gray scale represents the ratio of relative sizes of an MCU between G1 and G2 cells. White indicates a larger area in G1 cells, while black indicates a larger area in G2 cells. Geometrical shapes colored in white represent MCUs, with a greater area in G1 cells, whereas geometrical shapes colored in black represent MCUs, which are bigger in G2 cells. Network depicted in FIG. 2 C was constructed the same way (B) Heat maps of z-scored 4i intensity loadings (rows) of the highlighted MCUs in FIG. 2 A (geometrical shape outline, columns). (C) Interaction maps identify differential abundance of MCUs associated with the endomembrane system and mitochondria between cells in areas of high and low cell crowding. Geometrical shape coloring as in (A) for high versus low cell crowding. Geometrical shapes in white represent MCUs, with a greater area at high crowding, whereas geometrical shapes in black represent MCUs, which are bigger cells at low crowding. Geometrical shapes of special interest are numbered according to numbering in FIG. 1 B. (D) Heat maps of z-scored 4i intensity loadings (rows) of the highlighted MCUs in FIG. 2 C.

Figure 3:
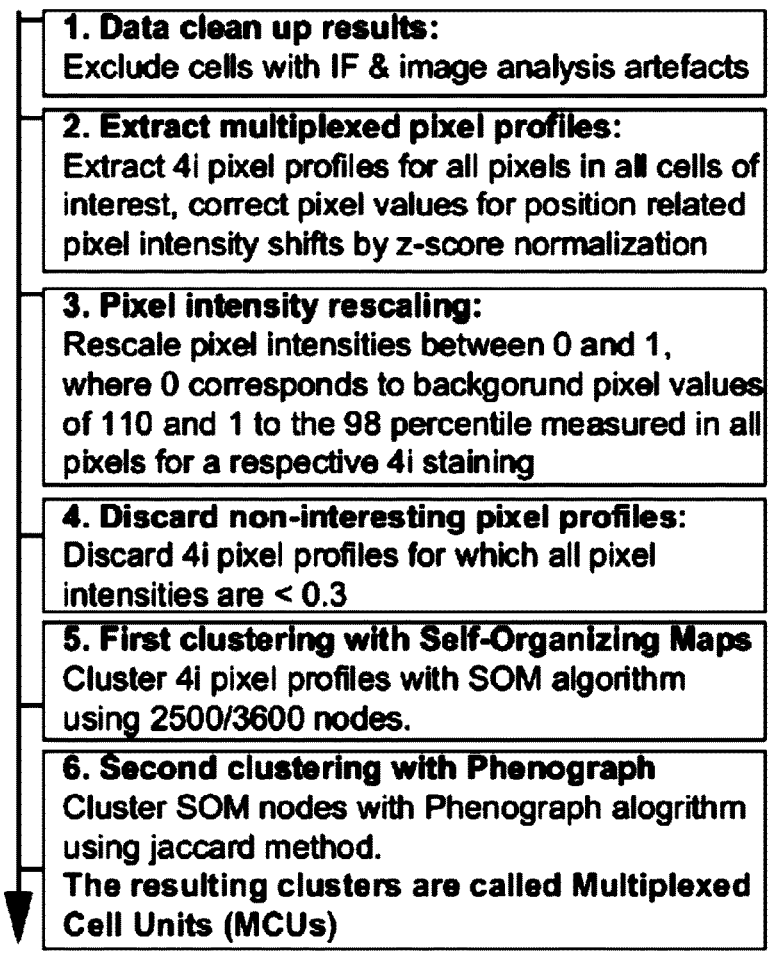
Figure 3:
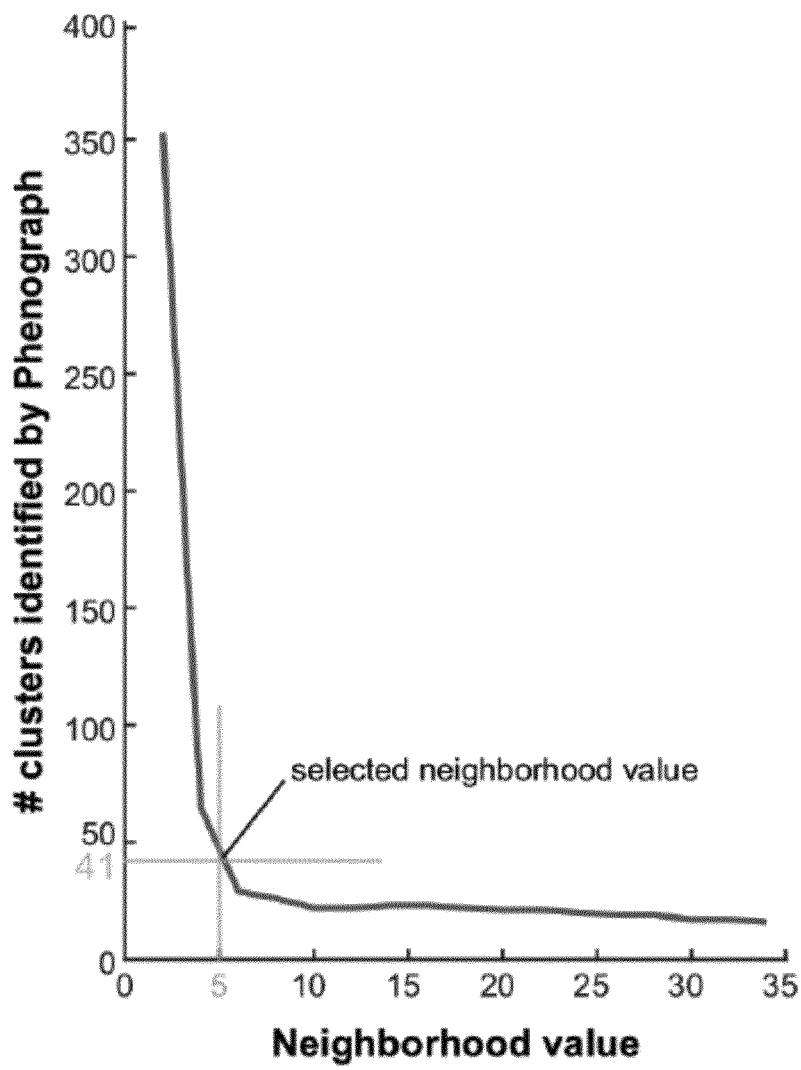
Figure 3:
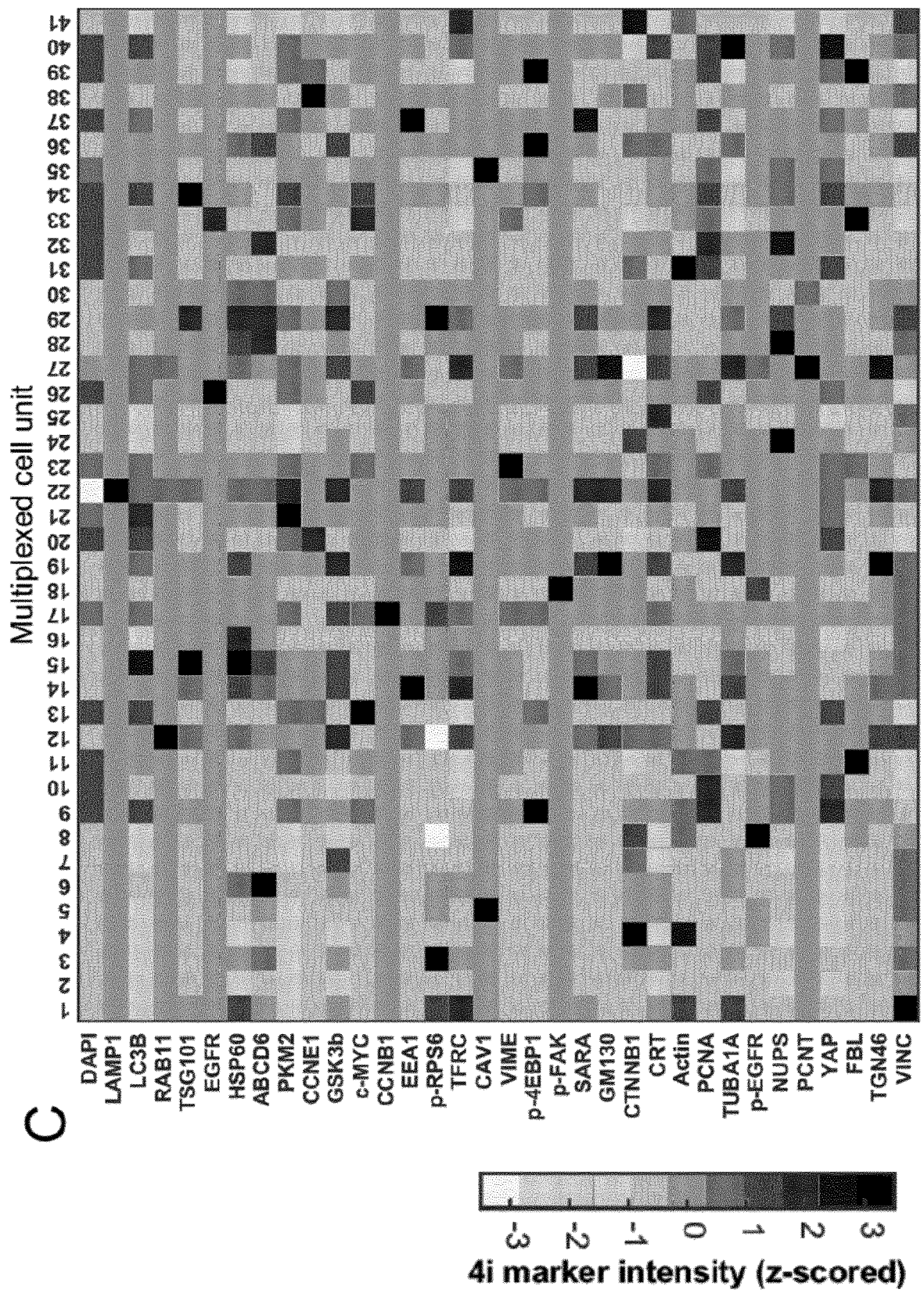
Figure 3:
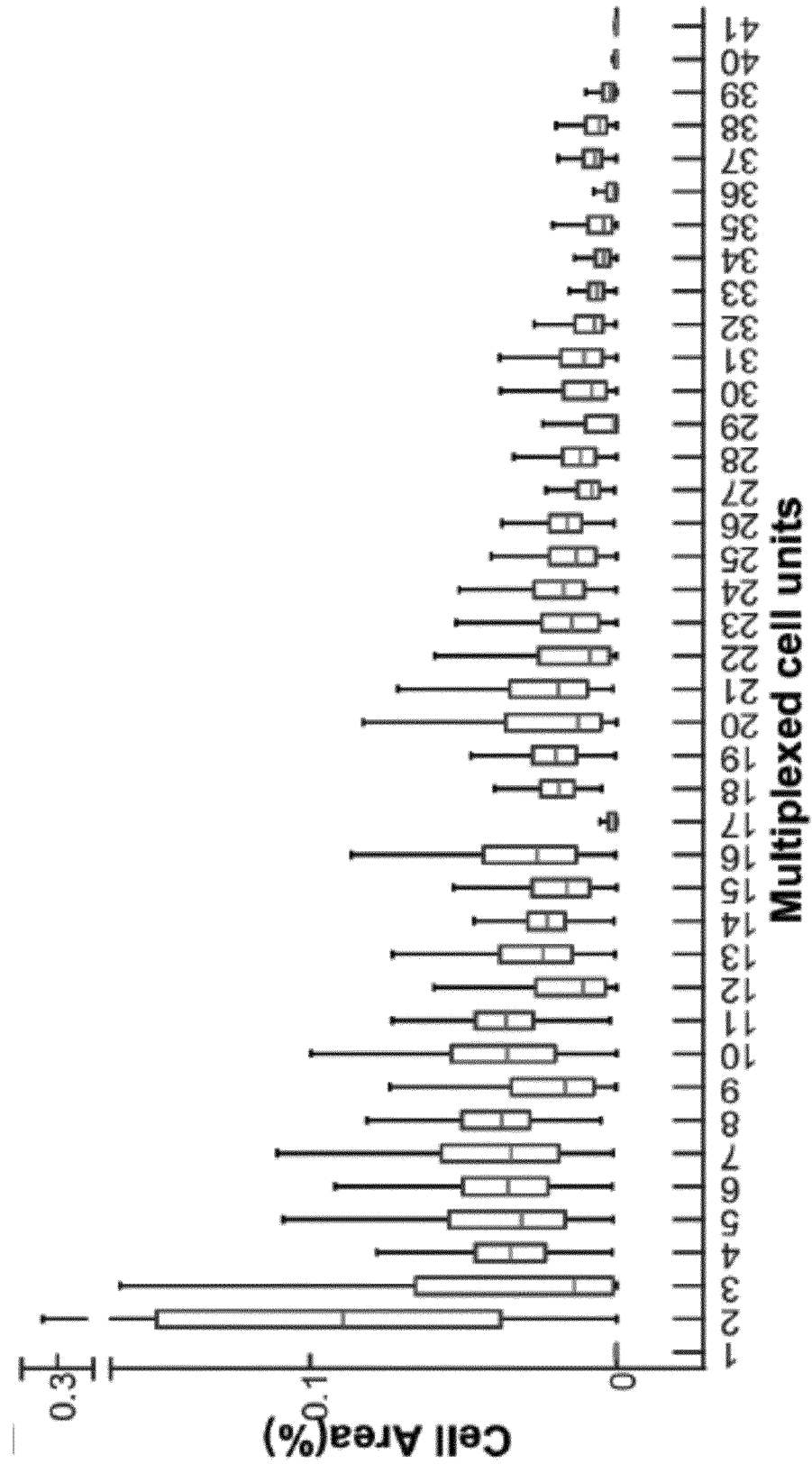
Figure 3:
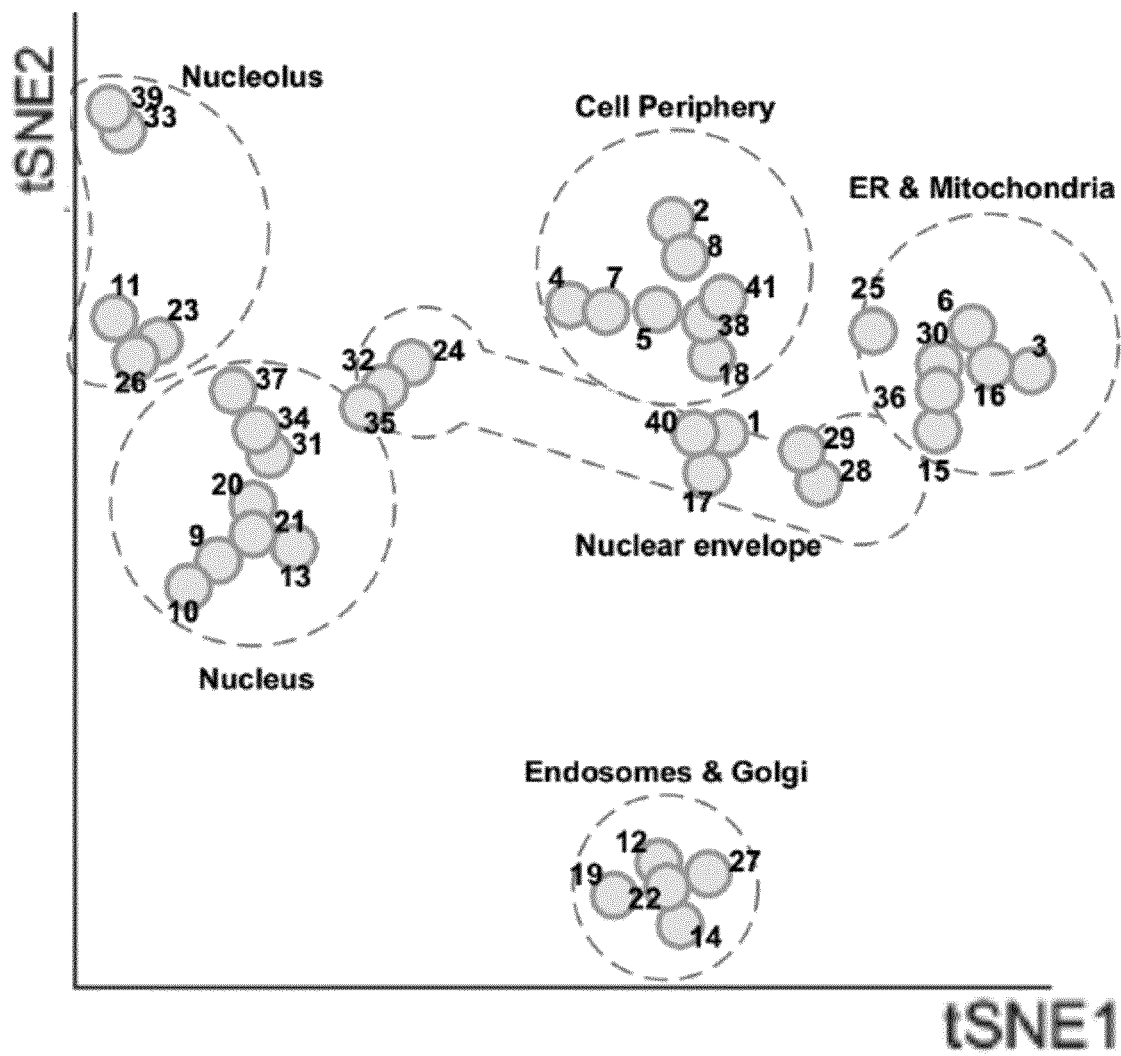
Figure 3:
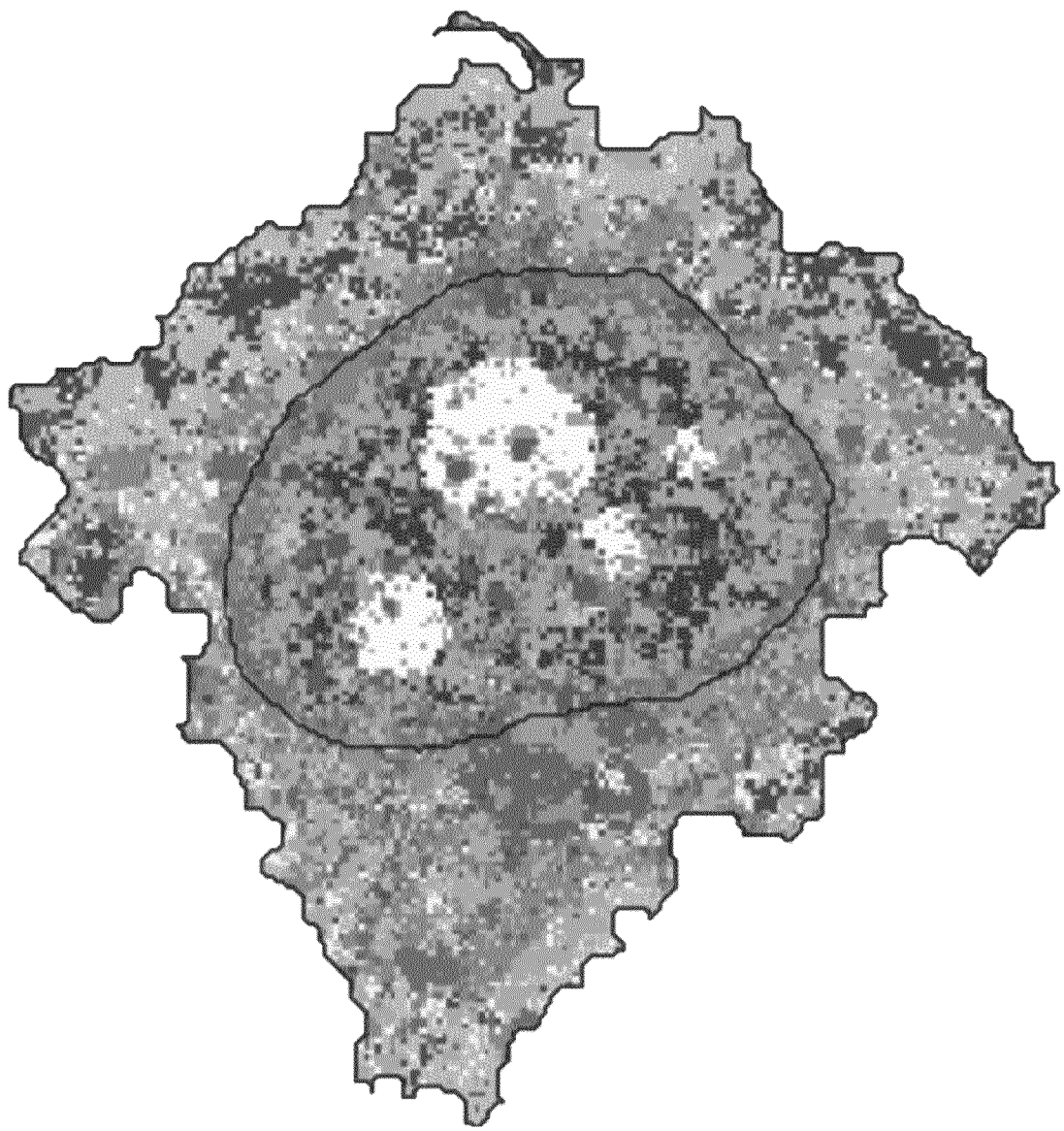

FIG. 3 Interaction map construction (A) Step by step workflow for the construction of interaction maps. (B) Line plot visualizing number of identified clusters by Phenograph (Y axis) at different neighborhood values (X axis), when analyzing multiplexed intensity profiles of SOM neurons. The neighbourhood value is given by the number of neighbors for graph construction. Neighbourhood value for MCU detection was selected at the inflection point of the line graph. This is one way of determining a number of suitable clusters for the clustering step. (C) Heatmap of z-scored 4i marker intensity (rows) of 41 MCU (columns) identified in an unperturbed population of HeLa cells. 4i marker intensities were z-scored for each 4i marker individually over all MCUs. (D) Boxplot of MCU size for 300 randomly picked cells from a population of unperturbed HeLa cells. Boxplot is constructed as follows: central mark indicates population median, box indicates population range between 25th and 75th percentile, Whiskers cover of 99.3% of population range, outliers are marked as dots. (E) Interaction map with all MCUs (41) identified in HeLa cells. Each MCU is depicted as a geometrical shape (gray) and labeled with corresponding MCU number. (F) 41 MCUs projected with different gray-scale on to the cell segmentation of a representative HeLa cell.

Figure 4:
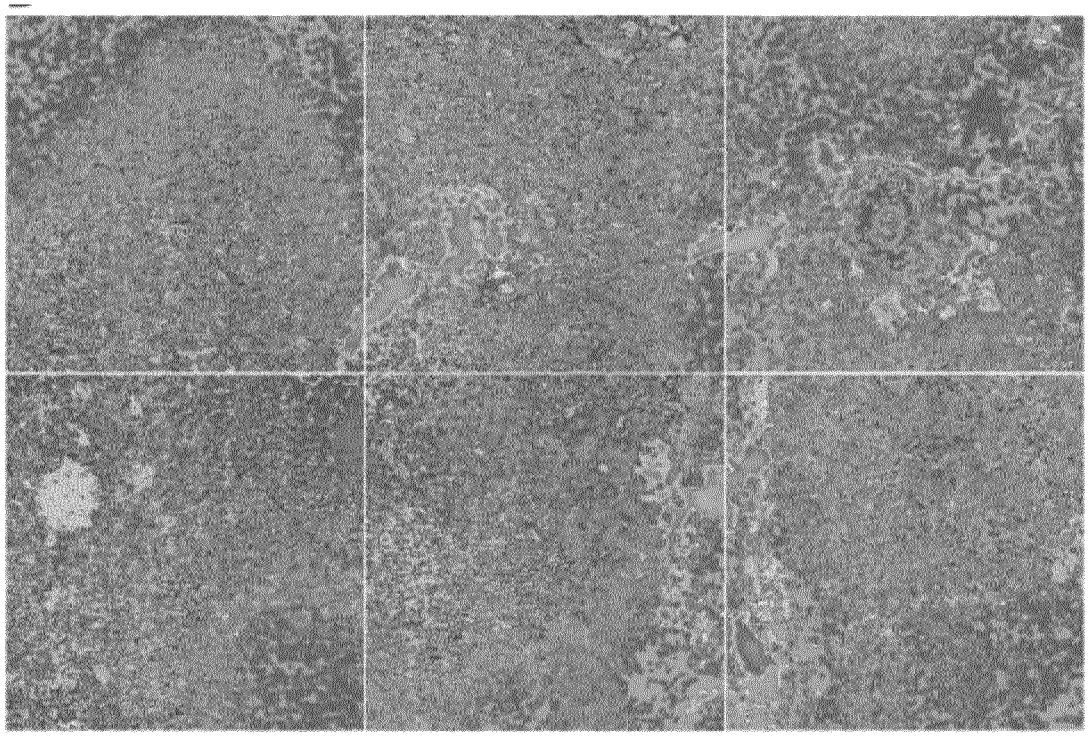
Figure 4:
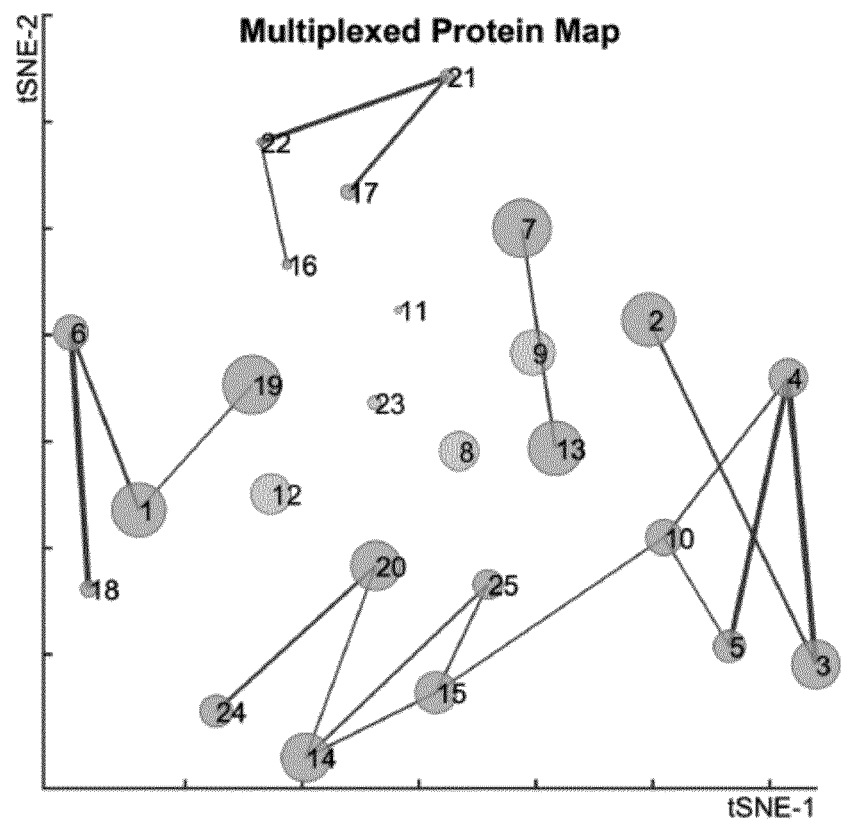
Figure 4:
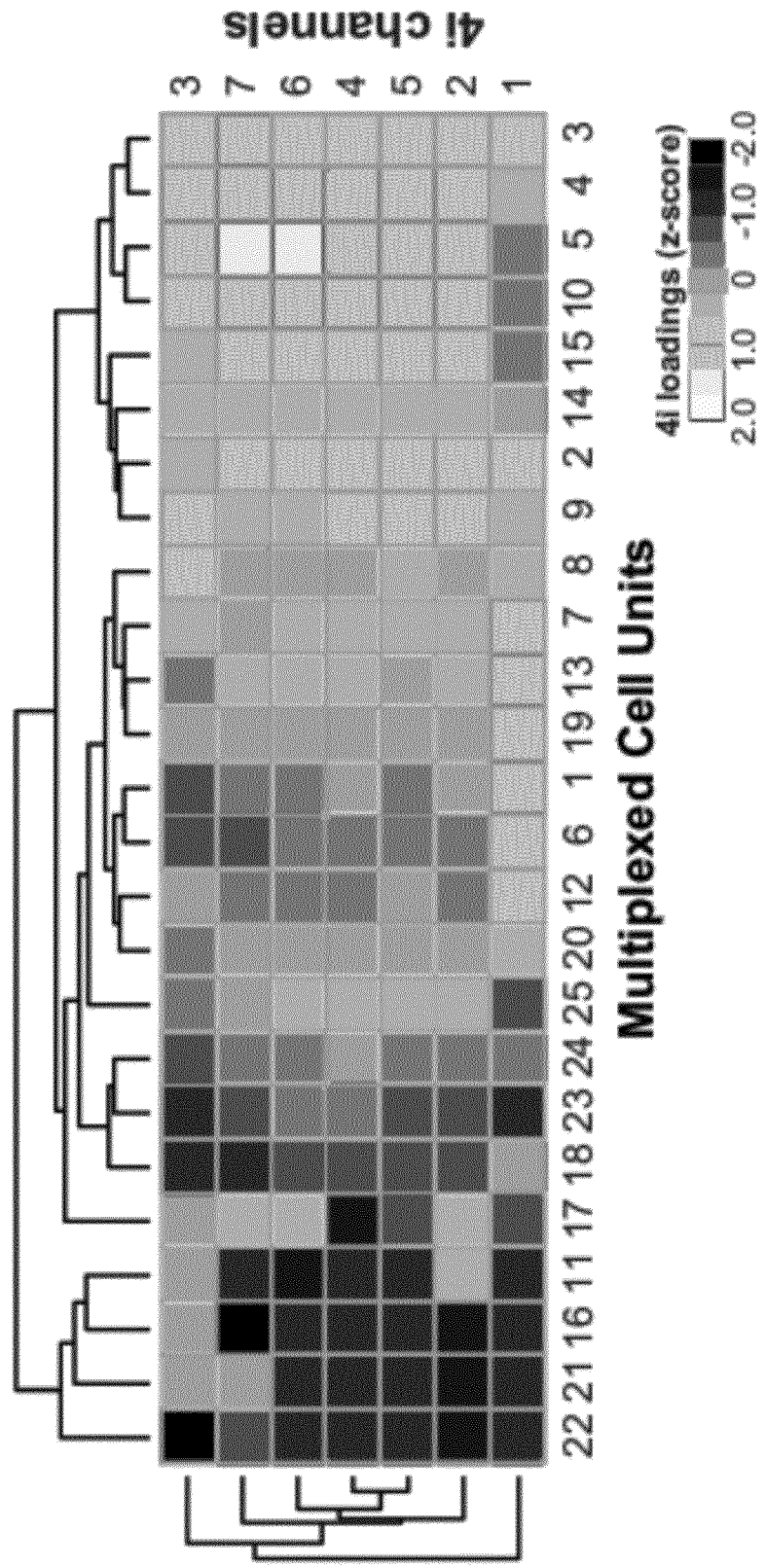

FIG. 4 MCUs from tissue (A) Multiplexed Cell Unit (MCU) projection onto tissue image of a mouse spleen generated by Iterative Indirect Immunofluorescence Imaging (4i). Pixels of the image are colorcoded based on the assignment into an MCU as determined by the MPM algorithm. (B) Graphical representation of an MPM generated by multiplexed pixel profiles extracted from subfigure A. MCUs, represented as nodes, are placed within a 2D plane using t-SNE. Node diameter represents the fraction of pixels assigned to that MCU. Nodes are connected by their pairwise SPS. SPS values >2.2 standard deviations away from the mean are depicted as edges. (C) Heatmaps of z-scored intensity loadings of 4i channels. MCUs and 4i channels are hierarchically sorted.

EXAMPLE 1

The inventors compared the abundance of MCUs and their spatial interactions between cells in different phases of the cell cycle (FIG. 2A, B). As expected, MCUs containing cell cycle markers show strong differences. A cytoplasmic MCU enriched for Cyclin B1 (MCU 17) is much more abundant in cells in G2, while a nuclear MCU enriched for Cyclin E (MCU 20) is much more abundant in cells in G1. It also identifies other nuclear MCUs (MCU 9, 10 and 13), which contain specific combinations of c-Myc, phospho-4EBp1, and YAP, and which are more abundant in cells in G2. Similarly, it identifies cytoplasmic MCUs enriched in phospho-S6 (MCU 3 and 29) as being more abundant in cells in G2. This reflects the adaptation of signalling activities and their downstream effects on transcription factors to the cell cycle (34-37). Strikingly, it also correctly identified the duplication of the centrosome (PCNT) in G2 as well as the concomitant increase in abundance of Golgi complex markers (38) (TGN46, GM130) (MCU 27), which are key functional differences between single cells that are only represented by 8 MCUs covering a few pixels. Highlighting all these MCUs in particular single cells underscores their accuracy and sensitivity. When the inventors compared single cells that experience either low or high local cell crowding (FIG. 2C, D), it was observed that MCUs containing markers of multiple endocytic organelles in various subcellular locations (MCU 12, 14, 15, 19 22, 37) are more abundant in cells experiencing high crowding. In contrast, MCUs containing markers of mitochondria (HSP60) and peroxisomes (ABCD3) (MCU 6, 16, 25, 28, 29) are more abundant in cells experiencing low crowding. This indicates a global inverse adaptation of organelles involved in catabolism versus biosynthesis to the available space a single cell has to grow in.

The approach was also verified on tissue sections of a mouse spleen (FIG. 4).

Taken together, this shows that the present unsupervised data-driven approach accurately and sensitively quantifies changes in cellular sub-compartmentalization to a high level of spatial detail, and enables the meaningful interpretation of intracellular complexity by integrating multiple small differences in each of the multiplexed measurements.

REFERENCES

[1] P. J. Thul et al., "A subcellular map of the human proteome". Science 356, (2017).

[2] Levine, Jacob H. et al. "Data-Driven Phenotypic Dissection of AML Reveals Progenitor-like Cells that Correlate with Prognosis" Cell, Volume 162, Issue 1, 184-197. doi: 10.1016/j.cell.2015.05.047

The invention claimed is:

1. A method for processing multiplexed image data of a biological sample, the method comprising the steps of:
   a) Recording a plurality of images of a biological sample, wherein the plurality of images comprises images having a different entity of the biological sample targeted with a predefined stain;
   b) Registering the plurality of images, thereby determining spatially corresponding image pixels;
   c) Associating the spatially corresponding image pixels to a pixel profile, wherein each pixel profile comprises the pixel values of the spatially corresponding pixels and wherein the pixel profile is associated with the respective image coordinate of the spatially corresponding pixels;
   d) Pooling the pixel profiles by means of a clustering method configured to determine pixel profiles with similar values, and thereby generating a plurality of clusters, each comprising pixel profiles with similar pixel values;
   e) For each cluster assigning a cluster value to the image coordinate of the pixel profiles comprised by said cluster and thereby generating a cluster image with cluster pixels, wherein
      i) For each cluster pixel in the cluster image the cluster values of adjacent cluster pixels in the cluster image are determined and thereby for each cluster value pair a probability of adjacency is determined;
      ii) Generating at least one randomized cluster image, wherein the image coordinates of the cluster pixels in the at least one randomized cluster image are randomly inter-changed;
      iii) For each cluster pixel in the at least one randomized cluster image the cluster values of adjacent cluster pixels in the randomized cluster image are determined and thereby for each cluster value pair a probability of random adjacency is determined and wherein the probability of random adjacency is determined for all of the randomized cluster images;
      Determining an adjusted probability of adjacency by calculating a deviation, particularly a difference between the probability of adjacency and the probability of random adjacency.

2. Method according to claim 1, wherein
   Generating an interaction map, wherein the clusters are arranged at a distance to each other, wherein the distance is indicative to the absolute value of the adjusted probability of adjacency.

3. Method according to claim 2, wherein each cluster in the interaction map is displayed as a geometric shape, wherein a size of the geometric shape is indicative to a relative occurrence of the cluster with respect to the occurrence of the other clusters, and/or wherein the geometric shapes are connected by lines, wherein a negative adjusted probability is reflected in a first line color and a positive adjusted probability is reflected in a second line color.

4. Method according to claim 2, wherein the clusters are arranged in the interaction map by a dimensionality reduction method, such as a distributed stochastic neighbor embedding (tSNE) method.

5. Method according to claim 1, wherein the plurality of images comprises a first set of images and a second set of images, wherein the first set of images comprises or consists of images of the biological sample under a first experimental condition, such as a control condition, and the second set of images comprises or consists of images of the biological sample under a second experimental condition, wherein the first and second set of images comprise corresponding images that are recorded from the biological sample having the same entity of the biological sample targeted with the same stain.

6. Method according to claim 3, wherein the relative occurrence of the cluster is determined from the images of the first and second set and wherein a color of the geometric shape is indicative of whether the relative occurrence of the cluster has become smaller or larger under the second experimental condition with respect to the first experimental condition.

7. Method according to claim 1, wherein the clustering method executes an ensemble learning method, particularly random forest clustering or k-means clustering, and/or an artificial neural network, particularly growing neural gas or a self-organizing map method, and/or a graph-based method, such as phenograph, and determines the clusters.

8. Method according to claim 1, wherein the clustering method executes in a first step a first ensemble learning method, and/or a first artificial neural network, wherein the clustering method executes in a second step a second ensemble learning method, and/or a second artificial neural network, and/or a graph-based method, wherein the second ensemble learning method, the second artificial neural network and/or the graph-based method of the second step further processes the results of the first ensemble learning method and/or the first artificial neural network of the first step and determines the clusters.

9. Method according to claim 8, wherein the first step comprises or generates 2-2000 clusters.

10. Method according to claim 1, wherein the biological sample comprises a plurality of biological cells.

11. Method according to claim 1, wherein the plurality of images comprises the biological sample targeted with at least 5 different stains.

12. Method according to claim 1, wherein three-dimensional image data is acquired from the sample, wherein the image pixels are voxels.

13. Method according to claim 1, wherein the biological sample consists of a single cell only or wherein the biological sample is a tissue sample obtained from a subject.

14. Method according to claim 1, wherein the pixel profiles are pooled in at least 20 clusters.

15. Method according to claim 1, wherein a set of buffers comprising at least the three following buffers:
   a blocking buffer comprising a blocking compound that is capable of binding to hydrophobic binding sites non-specifically, a sulfhydryl-reactive compound, and a buffering component;
   an imaging buffer comprising a thiol-containing compound and a pH between 7.2 and 7.6;
   an elution buffer comprising a reducing agent, at least one compound disrupting hydrogen bonds, a buffering component and a pH lower than (<) 4;
   used for blocking and imaging the biological sample and eluting the stains, particularly stains comprising antibodies, between subsequent imaging steps for generating the plurality of images.

16. A computer program comprising instructions which, when the program is executed by a computer, cause the computer to carry out the method of claim 1.

* * * * *